United States Patent
Wei et al.

(10) Patent No.: US 11,928,957 B2
(45) Date of Patent: Mar. 12, 2024

(54) AUDIOVISUAL SECONDARY HAPTIC SIGNAL RECONSTRUCTION METHOD BASED ON CLOUD-EDGE COLLABORATION

(71) Applicant: NANJING UNIVERSITY OF POSTS AND TELECOMMUNICATIONS, Nanjing (CN)

(72) Inventors: Xin Wei, Nanjing (CN); Liang Zhou, Nanjing (CN); Yingying Shi, Nanjing (CN); Zhe Zhang, Nanjing (CN); Siqi Zhang, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 18/247,845

(22) PCT Filed: Jul. 1, 2022

(86) PCT No.: PCT/CN2022/103301
§ 371 (c)(1),
(2) Date: Apr. 4, 2023

(87) PCT Pub. No.: WO2023/280064
PCT Pub. Date: Jan. 12, 2023

(65) Prior Publication Data
US 2023/0290234 A1    Sep. 14, 2023

(30) Foreign Application Priority Data

Jul. 9, 2021    (CN) .......................... 202110776711.8

(51) Int. Cl.
*G08B 6/00*         (2006.01)
*G06N 3/0455*     (2023.01)
(Continued)

(52) U.S. Cl.
CPC ............. *G08B 6/00* (2013.01); *G06N 3/0455* (2023.01); *G06N 3/084* (2013.01); *G06N 3/0895* (2023.01); *G06V 10/806* (2022.01); *G06V 20/46* (2022.01)

(58) Field of Classification Search
CPC .... G06N 3/0455; G06N 3/0895; G06N 3/084; G06V 10/806; G06V 20/46; G08B 6/00
See application file for complete search history.

(56) References Cited

U.S. PATENT DOCUMENTS

2021/0055796 A1    2/2021    Mansbridge et al.

FOREIGN PATENT DOCUMENTS

| CN | 109559758 A | 4/2019 |
| CN | 110956651 A | 4/2020 |

(Continued)

OTHER PUBLICATIONS

Cai S., Visual-tactile cross-modal data generation using residue-fusion gan with feature-matching and perceptual losses. Jul. 1 https://shaoyuca.github.io/mypage/assets/img/Visual_Tactile_Generation.pdf (Year: 2021).*

(Continued)

*Primary Examiner* — Marc S Somers
*Assistant Examiner* — Adam C Standke
(74) *Attorney, Agent, or Firm* — HAUPTMAN HAM, LLP

(57) ABSTRACT

An audio visual haptic signal reconstruction method includes first utilizing a large-scale audio-visual database stored in a central cloud to learn knowledge, and transferring same to an edge node; then combining, by means of the edge node, a received audio-visual signal with knowledge in the central cloud, and fully mining semantic correlation and consistency between modals; and finally fusing the semantic features of the obtained audio and video signals and input- (Continued)

ting the semantic features to a haptic generation network, thereby realizing the reconstruction of the haptic signal. The method effectively solves the problems that the number of audio and video signals of a multi-modal dataset is insufficient, and semantic tags cannot be added to all the audio-visual signals in a training dataset by means of manual annotation. Also, the semantic association between heterogeneous data of different modals are better mined, and the heterogeneity gap between modals are eliminated.

5 Claims, 4 Drawing Sheets

(51) Int. Cl.
*G06N 3/084* (2023.01)
*G06N 3/0895* (2023.01)
*G06V 10/80* (2022.01)
*G06V 20/40* (2022.01)

(56) References Cited

FOREIGN PATENT DOCUMENTS

CN 111966226 A 11/2020
CN 113642604 A 11/2021

OTHER PUBLICATIONS

Hu R., et al., AVMSN: An audio-visual two stream crowd counting framework under low-quality conditions. IEEE Access. Apr. 26, 2021 (Year: 2021).*

International Search Report issued in International Patent Application No. PCT/CN2022/103301, dated Sep. 26, 2022, Beijing, China, 7 pgs.

Written Opinion of the ISA issued in International Patent Application No. PCT/CN2022/103301, dated Sep. 26, 2022, Beijing, China, 9 pgs.

* cited by examiner

FIG. 4

AUDIOVISUAL SECONDARY HAPTIC SIGNAL RECONSTRUCTION METHOD BASED ON CLOUD-EDGE COLLABORATION

RELATED APPLICATIONS

The present application is a U.S. National Phase of International Application Number PCT/CN2022/103301 filed Jul. 1, 2022, and claims priority to Chinese Application Number 202110776711.8 filed Jul. 9, 2021.

Technical Field

The present disclosure relates to the technical field of haptic signal generation, and in particular to an audio-visual-aided haptic signal reconstruction method based on a cloud-edge collaboration.

BACKGROUND

With a maturity of the traditional multi-media application related technology, people begin to pursue a sensory experience with more dimensions and high-levels while people's audio-visual requirements are greatly satisfied. The haptic information is gradually integrated into the existing service of the audio-visual multi-media to form a multi-modal service, which is expected to bring more extreme and various interactive experience. Proposed is a cross-modal communication technology for supporting multi-modal services, which has a certain effectiveness on ensuring the quality of multi-modal flows, but still faces some technical challenges when a multi-modal communication is applied to the haptic-based multi-modal services. First of all, the haptic stream is extremely sensitive to interferences and noises in wireless links, which leads to a degradation or even a loss of the haptic signals at the receiving terminal, and this problem is serious and inevitable, especially in an application scenario of remote operations, such as a remote industrial control and a remote surgery. Secondly, service providers do not have the haptic acquisition equipment while users need haptic perceptions, especially in an application scenario of virtual interaction, such as an online immersive shopping, a holographic museum guide, and virtual interactive movies, the users have high requirements for haptic senses, which requires the "virtual" touch senses or haptic signals to be generated base on the video signals and audio signals.

At present, the haptic signals damaged or partially missing due to the wireless communication unreliability and communication noise interference may be self-recovered from two aspects. The first aspect is based on the traditional signal processing technology, which finds a specific signal with a most similar structure by using the sparse representation, and then estimates a loss part of the damaged signals by using the specific signal. The second aspect is to excavate and utilize the spatial-temporal correlation of signals itself to realize a self-repair and a reconstruction within modality. However, when the haptic signals are seriously damaged or even do not exist, the reconstruction scheme within modality will fail.

In recent years, some studies has focused on correlations among different modalities, by which a cross-modal reconstruction has been realized. Li et al. have proposed in the document "Learning cross-modal visual-tactile representation using ensembled generative adversarial networks" that the required category information is obtained by using image features, and taken with the noises to be an input of the generative adversarial networks to generate the haptic spectrogram in the corresponding category. The method also mine the semantic correlation among the modalities. As the information provided by the category is limited, the generated results are usually inaccurate. An encoder-decoder network is expanded by Kuniyuki Takahashi et al. in the document "Deep Visuo-Tactile Learning: Estimation of Tactile Properties from Images", which embeds video attributions and audio attributions into a latent space, and focus on degrees of haptic attributions of materials represented by latent variables. Further, Matthew Purr et al. have proposed in the document "Teaching Cameras to Feel: Estimating Tactile Physical Properties of Surfaces From Images" that haptic physical attributions are evaluated from a single image by a cross-modal learning framework with an adversarial learning and a cross-domain joint classification. Although the semantic information among the modalities is used by this kind of method, the complete haptic signals are not generated by this kind of method, which has no practical significance for multi-modal services.

The above existing cross-modal generation methods still have the following defects. A training on a model of the existing cross-modal generation methods depends on a large-scale training data to ensure performance of the model. However, a coexistence of multi-modal data always has problems such as small data volume, incomplete data, and imbalance data. It also ignores problems of the limited caching, computing capacity at the terminal. In addition, the existing cross-modal generation methods only use the information of a single modal, which cannot provide enough information. When different modalities describe the same semantics together, they may contain an unequal amount of information, such that the complementation and enhancement of information among the modalities will help to improve generation effects.

SUMMARY

The technical problems to be solved by the present disclosure are to eliminate the disadvantages in the prior art and to provide an audio-visual-aided haptic signal reconstruction method based on a cloud-edge collaboration. This method realizes an accurate extraction of semantic features under the sparse data by means of a self-supervision learning for an unmarked large-scale audio-visual database stored on the central cloud. It then takes advantages of multi-modal feature fusion, explores semantic information of the video and the audio modalities to the greatest extent. It finally generates a complete haptic signal, which is further in accordance with requirements for multi-modal services.

In order to solve the above-mentioned technical problems, the following technical solutions are adopted by the present disclosure.

Provided is an audio-visual-aided haptic signal reconstruction method based on a cloud-edge collaboration according to the present disclosure. The method includes the following steps.

In Step (1), a self-supervision learning task is executed on a large-scale audio-visual database stored on a central cloud. The self-supervision learning task refers to determining whether video frames and audio clips are from the same audio-visual source, thereby obtaining a pre-trained audio feature extraction network and a pre-trained video feature extraction network.

In Step (2), an audio-visual-aided haptic signal reconstruction AVHR model is designed at an edge node, the AVHR model is specifically as follows.

After audio signals and video signals are received by the edge node, first the pre-trained audio feature extraction network and the pre-trained video feature extraction network on the central cloud are taken as an audio attribute extraction network and a video attribute extraction network of the edge node. After audio signal attributes and video signal attributes are extracted, audio signal features and video signal features associated between the audio signals and the video signals are further extracted from the audio signal attributes and the video signal attributes.

Then, the audio signal features and the video signal features are fused by using a fusion network combining a multi-modal collaboration and a multi-modal joint paradigm and fused features are obtained.

Simultaneously, haptic signal features are extracted by a haptic feature extraction network.

An audio feature extraction network, a video feature extraction network, the haptic feature extraction network and the fusion network are trained according to the audio signal features, the video signal features, the haptic signal features and the fused features, by using a semantic correlation learning and semantic discrimination learning strategies. Shared semantics of the audio signals, the video signals, the haptic signals and the fused features are learned to obtain fused features containing the shared semantics.

Eventually, the fused features containing the shared semantics are input into a haptic signal generation network with semantic constraints to implement a reconstruction of a target haptic signal.

In Step (3), the AVHR model is trained at the central cloud and the edge node respectively by a gradient descent algorithm to obtain structures and parameters for an optimal AVHR model.

In Step (4), paired audio signals and video signals to be tested are input into the optimal AVHR model. The optimal AVHR model is configured to extract and fuse semantic features of the audio signals and the video signals, and generate the target haptic signal by fused features containing the shared semantics.

As a further optimized solution of the audio-visual-aided haptic signal reconstruction method based on the cloud-edge collaboration according to the present disclosure, Step (1) includes the following steps.

(1-1) For the large-scale audio-visual database $S=\{s_j\}_{j=1}^{M}$, where M is the number of the video frames and the audio clips that are in pair, $s_j=(v_j^s, a_j^s)$, $s_j$ is the j-th pair of the video frames and audio clips, the j-th video frame $v_j^s$ and the j-th audio clip $a_j^s$ are respectively transferred to the video feature extraction network and the audio feature extraction network, and the corresponding video features and audio features are extracted accordingly.

(1-2) The video features and the audio features are connected and input into an integrated network composed of a plurality of full-connection layers, the integrated network outputs integrated features, and then the self-supervision learning task is performed by using the integrated features. An objective of the self-supervision learning is to determine whether the video frames and audio clips are from the same audio-visual source; and specifically, a self-supervision loss function is defined as follows:

$$L_{Src} = -\frac{1}{M}\Sigma_{j=1}^{M} p(g_j^s; \theta_g^s)\log \hat{p}(g_j^s; \theta_g^s) + [1 - p(g_j^s; \theta_g^s)]\log[1 - \hat{p}(g_j^s; \theta_g^s)],$$

where $L_{Src}$ is the self-supervision loss function, $g_j^s=[G_v(v_j^s; \theta_v^s), G_a(a_j^s; \theta_a^s)]$ is a feature after integrating of the j-th pair of video frame features and audio clip features, $G_v(\bullet)$ is a feature mapping of the video feature extraction network, $\theta_v^s$ is a parameter for the video feature extraction network, $G_a(\bullet)$ is a feature mapping of the audio feature extraction network, and $\theta_a^s$ is a parameter for the audio feature extraction network. $p(\bullet)$ represents a tag indicator, when the tag indicator is 1, it represents that the video frames and audio clips are from the same audio-visual source, and when the tag indicator is 0, it represents that the video frame and audio clip are from different audio-visual sources. $\hat{p}(\bullet)$ represents a correspondence predicted value output from the integrated network and $\theta_g^s$ represents a parameter for the integrated network composed of the plurality of full-connection layers. The pre-trained audio feature extraction network and the pre-trained video feature extraction network are obtained by minimizing $L_{Src}$.

As a further optimized solution of the audio-visual-aided haptic signal reconstruction method based on the cloud-edge collaboration according to the present disclosure, Step (2) includes the following steps.

(2-1) An audio feature extraction network, a video feature extraction network, parameters for the audio feature extraction network and parameters for the video feature extraction network that are completely trained in the central cloud are migrated to the edge nodes directly. The audio feature extraction network and the video feature extraction network are taken as the audio attribute extraction network and the video attribute extraction network at the edge node, respectively.

(2-2) Complete audio signals, video signals and haptic signals received by the edge node are taken as a multi-modal training data set D, $D=\{d_i\}_{i=1}^{N}$, the i-th instance $d_i=(v_i, a_i, h_i)$, and $(v_i, a_i, h_i)$ is the i-th pair of multi-modal samples, where $v_i \in R^w$ is the i-th video signal in the multi-modal training data set, $R^w$ is a sample space of the video signals, and w is a sample dimensionality of the video signals; $a_i \in R^u$ is the i-th audio signal in the multi-modal training data set, $R^u$ is a sample space of the audio signals, and u is a sample dimensionality of the audio signals; $h_i \in R^e$ is the i-th haptic signal in the multi-modal training data set, $R^e$ is a sample space of the haptic signals, and e is a sample dimensionality of the haptic signals. Each of $d_i$ has a corresponding one-hot tag $y_i \in R^K$, $R^K$ is the tag space, where K is the number of categories in the multi-modal training data set.

(2-3) A video attribute $g^v=G_v(v; \theta_v^s)$ and an audio attribute $g^a=G_a(a; \theta_a^s)$ are extracted at the edge node by using the video feature extraction network and the audio feature extraction network migrated from the central cloud, where v is a video signal, and a is an audio signal; and then, $g^v$ and $g^a$ are further input into a multi-layer feature network to obtain a video signal feature $f^v=F_v(v; \theta_v)$ and an audio signal feature $f^a=F_a(a; \theta_a)$, $f^v$ and $f^a$ are associated with each other, where $F_v(\bullet)$ is the video feature extraction network at the edge node, $\theta_v$ represents the parameter for the video feature extraction network, $F_a(\bullet)$ is the audio feature extraction network at the edge node, and $\theta_a$ represents the parameter for the video feature extraction network.

(2-4) An encoder of an auto-encoder model is taken as the haptic feature extraction network at the edge node, and a target haptic signal feature $f^h=E_h(h; \theta_{he})$ for training is extracted by using the haptic feature extraction network, where h represents a haptic signal, $E_h(\bullet)$ represents the encoder at the edge node, and $\theta_{he}$ represents a parameter for the encoder.

(2-5) The $f^v$ and the $f^a$ are fused by using the fusion network combining a multi-modal collaboration paradigm and the multi-modal joint paradigm, and the fused features are obtained.

A, the multi-modal collaboration is that semantic similarities between $f^a$, $f^v$ and $f^h$ under a constraint of a haptic modal are maximized.

B, a multi-modal joint is that $f^a$ and $f^v$ are deeply integrated on a basis of the multi-modal collaboration paradigm, the specific processes are as follows:

$$f^m = F_m(f^a, f^v; \theta_m),$$

where $f^m$ is a fused feature of the video signal feature and the audio signal feature that are associated with each other; $F_m(\bullet)$ is a mapping function of a multi-modal joint network, $F_m(\bullet)$ is a linear weighting of the $f^a$ and the $f^v$; and $\theta_m$ is the parameter for the multi-modal joint network.

(2-6) A learning of the shared semantics is executed on the video signal feature $f^v$, the audio signal feature $f^a$, the haptic signal feature $f^h$ and the fused feature $f^m$ that are associated with each other. The learning of the shared semantics includes the semantic correlation learning and the semantic discrimination learning.

The semantic correlation learning: a correlation constraint is performed on $f^v$, $f^a$, $f^m$ and the $f^h$ by selecting a contrast loss, and distances between $f^h$ and $f^v$, $f^a$ and $f^m$ that are matched with $f^h$ are reduced. Distances between $f^h$ and $f^v$, $f^a$ as well as $f^m$ that are not matched with the $f^h$ to be greater than a threshold $\delta$. A semantic related loss function is defined as follows:

$$L_{corr}^{av} = \sum_{p \neq q}^{N,N} \max(0, l_2(f_p^v, f_p^h) + l_2(f_p^a, f_p^h) + \delta - l_2(f_p^v, f_q^h) - l_2(f_p^a, f_q^h)), \text{ and}$$

$$L_{corr}^{m} = \sum_{p \neq q}^{N,N} \max(0, l_2(f_p^m, f_p^h) + \delta - l_2(f_p^m, f_q^h)),$$

where the audio signal feature $f^a$ and the haptic signal feature $f^h$ form an audio and haptic pair, the video signal feature $f^v$ and the haptic signal feature $f^h$ form an video and haptic pair, and $L_{corr}^{av}$ is a contrast loss function of audio haptic pair and the video haptic pair, $L_{corr}^{m}$ is a contrast loss function of the fused feature $f^m$ and the haptic signal feature $f^h$, $f_p^v$ is the p-th video signal feature, $f_p^a$ is the p-th audio signal feature, $f_p^m$ is the p-th fused feature, $f_p^h$ is the p-th haptic signal feature, and $f_q^h$ is the q-th haptic signal feature. $l_2(\bullet) = \|\bullet\|_2$ represents l2 norm.

The semantic discrimination learning: a full-connection layer with a softmax function is selected as a public classifier, and the public classifier is added to the video feature extraction network, the audio feature extraction network, the haptic feature extraction network and the fusion network. A consistency and a differentiation of cross-modal semantics are ensured under a guidance of supervision information. A semantic discrimination loss function is defined as follows:

$$L_{Dis} = -\frac{1}{N}\sum_i^N y_i \left[\log p(f_i^v; \theta_l) + \log p(f_i^a; \theta_l) + \log p(f_i^h; \theta_l) + \log p(f_i^m; \theta_l)\right],$$

where $L_{Dis}$ is the semantic discrimination loss function, $p(\bullet)$ is the public classifier, $f_i^v$ is the i-th video signal feature, $f_i^a$ is the i-th audio signal feature, $f_i^h$ is the i-th haptic signal feature, $f_i^m$ is the i-th fused feature, and $\theta_l$ is a parameter for the public classifier.

(2-7) The auto-encoder model includes the encoder and a decoder. A structure of the auto-encoder model is learned by comparing the haptic signal h for training with a haptic signal $\tilde{h}$ obtained during a process from the encoder to the decoder, and a reconstruction loss of the haptic signal is defined as follows:

$$L_{Rec} = \frac{1}{N}\sum_{i=1}^{N}\|\tilde{h}_i - h_i\|_2^2 + \alpha\|\theta_h\|_2^2,$$

where $L_{Rec}$ is a reconstruction loss function, $\tilde{h}_i$ is the i-th haptic signal reconstructed by the auto-encoder model, $\tilde{h}_i = D_h(E_h(h_i; \theta_{he}); \theta_{hd})$, and $h_i$ is the i-th real haptic signal. $E_h(\bullet)$ is the encoder serving as the haptic feature extract network and configured to extract haptic features. $D_h(\bullet)$ is the decoder serving as the haptic signal generation network and configured to generate the haptic features, and $\theta_h = [\theta_{he}, \theta_{hd}]$ represents a set of parameters for the encoder. Specifically, $\theta_{he}$ is a parameter for the encoder, $\theta_{hd}$ is a parameter for the decoder, and $\alpha$ is a hyperparameter.

(2-8) The target haptic signal h' is generated by using the decoder $D_h(\bullet)$ of the self-encoder model from the $f^m$ to implement the reconstruction of the target haptic signal, and the h' is remapped to the haptic signal feature $f^{h'}$ by the encoder $E_h(\bullet)$. A loss function of the haptic signal generated is defined as follows:

$$L_{Gen} = \frac{1}{N}\sum_{i=1}^{N}\left\{\|h_i - h_i'\|_2^2 + \beta\left[l_2(f_i^h, f_i^{h'}) + y_i \log p(f_i^{h'})\right]\right\} + \gamma\|\theta_{hd}\|_2^2,$$

where $L_{Gen}$ is a generating loss function of the haptic signal, $h_i' = D_h(f_i^m; \theta_{hd})$ is the i-th haptic signal generated by the fused feature, $f_i^m$ is the i-th fused feature, $f_i^h$ is the i-th haptic feature, $f_i^{h'} = E_h(h_i'; \theta_{hd})$ is a semantic feature of $h_i'$ extracted by the encoder, $l_2(f_i^h, f_i^{h'})$ represents a similarity between $f_i^h$ and $f_i^{h'}$, $y_i \log p(f_i^{h'})$ is a classification loss of the $f_i^{h'}$, and $p(f_i^{h'})$ is a predicted tag of the $f_i^{h'}$. $l_2(f_i^h, f_i^{h'})$ and $y_i \log p(f_i^{h'})$ together form a regular term of a loss function. $\beta$ and $\gamma$ are hyperparameters.

As a further optimized solution of the audio-visual-aided haptic signal reconstruction method based on the cloud-edge collaboration according to the present disclosure, Step (3) includes the following steps.

(3-1) The video feature extraction network and the audio feature extraction network are trained on a large-scale audio-visual database $S = \{s_j\}_{j=1}^{M}$ stored on a central cloud, the specific processes are as follows.

In Step 311, $\theta_v^s(0)$, $\theta_a^s(0)$ and $\theta_g^s(0)$ are initialized, and the $\theta_v^s(0)$, the $\theta_a^s(0)$ and the $\theta_g^s(0)$ are values for $\theta_v^s$, $\theta_a^s$ and $\theta_g^s$ in the 0-th iteration, respectively.

In Step 312, a total number of iterations is set to be $n_1$, the number of the iterations is given to be n=0; and a learning rate $\mu_1$ is set.

In Step 313, each network parameter is optimized by adopting a stochastic gradient descent method SGD:

$$\theta_v^s(n+1) = \theta_v^s(n) - \mu_1 \nabla_{\theta_v^s} L_{Src},$$

$$\theta_a^s(n+1) = \theta_a^s(n) - \mu_1 \nabla_{\theta_a^s} L_{Src}, \text{ and}$$

$$\theta_g^s(n+1) = \theta_g^s(n) - \mu_1 \nabla_{\theta_g^s} L_{Src},$$

where $\theta_v^s(n+1)$, $\theta_a^s(n+1)$ and $\theta_g^s(n+1)$ as well as $\theta_v^s(n)$, $\theta_a^s(n)$ and $\theta_g^s(n)$ are parameters for the video feature extraction network, the audio feature extraction network and an integrated network on the n+1-th central cloud and the n-th central cloud, respectively; and $\nabla$ is a partial derivative for each of loss function.

In Step 314, when n<$n_1$, it is skipped to Step 313, n=n+1, and a next iteration is continued; if not, the iterations are terminated.

In Step 315, after $n_1$ rounds of the iterations, an optimized video feature extraction network $G_v(\theta_v^s)$ and an optimized audio feature extraction network $G_a(\theta_a^s)$ are obtained.

(3-2) The AVHR model is trained on a multi-modal training data set received by the edge node, the specific processes are as follows.

In Step 321, $\theta_v(0)$, $\theta_a(0)$, $\theta_m(0)$, $\theta_{he}(0)$ and $\theta_l(0)$ are initialized, and the $\theta_v(0)$, the $\theta_a(0)$, the $\theta_m(0)$, the $\theta_{he}(0)$ and the $\theta_l(0)$ are values for $\theta_v$, $\theta_a$, $\theta_m$, $\theta_{he}$, and $\theta_l$ in the 0-th iteration, respectively.

In Step 322, the iterations is started, a total number of the iterations is set to be $n_2$, and the number of the iterations is set to be n'=0; and a learning rate $\mu_2$ is set.

In Step 323, parameters for each feature extraction network, the fusion network, and a public classifier are optimized by adopting the stochastic gradient descent method, functions are as follows:

$$\theta_v(n'+1)=\theta_v(n')-\mu_2\nabla_{\theta_v}(L_{corr}^{av}+L_{corr}^{m}+L_{Dis}),$$

$$\theta_a(n'+1)=\theta_a(n')-\mu_2\nabla_{\theta_a}(L_{corr}^{av}+L_{corr}^{m}+L_{Dis}),$$

$$\theta_{he}(n'+1)=\theta_{he}(n')-\mu_2\nabla_{\theta_{he}}(L_{corr}^{av}+L_{corr}^{m}+L_{Dis}+L_{Rec}),$$

$$\theta_l(n'+1)=\theta_l(n')-\mu_2\nabla_{\theta_l}L_{Dis}, \text{ and}$$

$$\theta_m(n'+1)=\theta_m(n')-\mu_2\nabla_{\theta_m}(L_{corr}^{m}+L_{Dis}),$$

where $\theta_v(n'+1)$, $\theta_a(n'+1)$, $\theta_{he}(n'+1)$, $\theta_l(n'+1)$, $\theta_m(n'+1)$ and $\theta_v(n')$, $\theta_a(n')$, $\theta_{he}(n')$, $\theta_l(n')$, and $\theta_m(n')$ are respectively parameters for the video feature extraction network, the audio feature network, the encoder, and the public classifier in the n'+1-th iteration and in the n'-th iteration at the edge node; and the $\nabla$ is the partial derivative for each loss function.

In Step 324, a parameter for the decoder is optimized by adopting the stochastic gradient descent method SGD:

$$\theta_{hd}(n'+1)=\theta_{hd}(n')-\mu_2\nabla_{\theta_{hd}}(L_{Gen}+L_{Rec}),$$

where $\theta_{hd}(n'+1)$ and $\theta_{hd}(n')$ are respectively parameters for the decoder in the n'+1-th iteration and in the n'-th iteration at the edge node; and the $\nabla$ is the partial derivative for each loss function.

In Step 325, when n'<$n_2$, it is skipped to Step 323, n'=n'+1, and the next iteration is continued; if not, the iterations are terminated.

In Step 326, after $n_2$ iterations, the optimal AVHR model is obtained. The optimal AVHR model includes the optimized video feature extraction network, the optimized audio feature extraction network, an optimized haptic feature extraction network, an optimized fusion network and an optimized haptic signal generation network.

As a further optimized solution of the audio-visual-aided haptic signal reconstruction method based on the cloud-edge collaboration according to the present disclosure, Step (4) includes the following steps.

(4-1) The AVHR model completely trained is adopted.

(4-2) A pair of an audio signal v̂ and a video signal â to be tested are input into the AVHR model completely trained, the respective audio and video features are extracted and then fused. A desired haptic signal ĥ' is generated by the fused features containing the shared semantics.

Compared with the prior art, the above technical solutions adopted by the present disclosure have the following beneficial effects.

An accurate extraction of semantic features under the sparse data is realized by means of a self-supervision learning of an unmarked large-scale audio-visual database stored on the central cloud. The method gives full play to advantages of a multi-modal feature fusion, utilizes semantic information of the video and the audio modalities to the greatest extent, and also generates a complete haptic signal, which is further in accordance with requirements for multi-modal services.

BRIEF DESCRIPTION OF THE DRAWINGS

FIG. 4 illustrates schematic diagrams of haptic signal reconstruction results in the present disclosure and other comparison methods.

DETAILED DESCRIPTION OF THE EMBODIMENTS

In order to enable the objectives, technical solutions and advantages of the present disclosure to be more clear, the present disclosure will be further clarified below in conjunction with the accompanying drawings and the embodiments.

Figure 1:
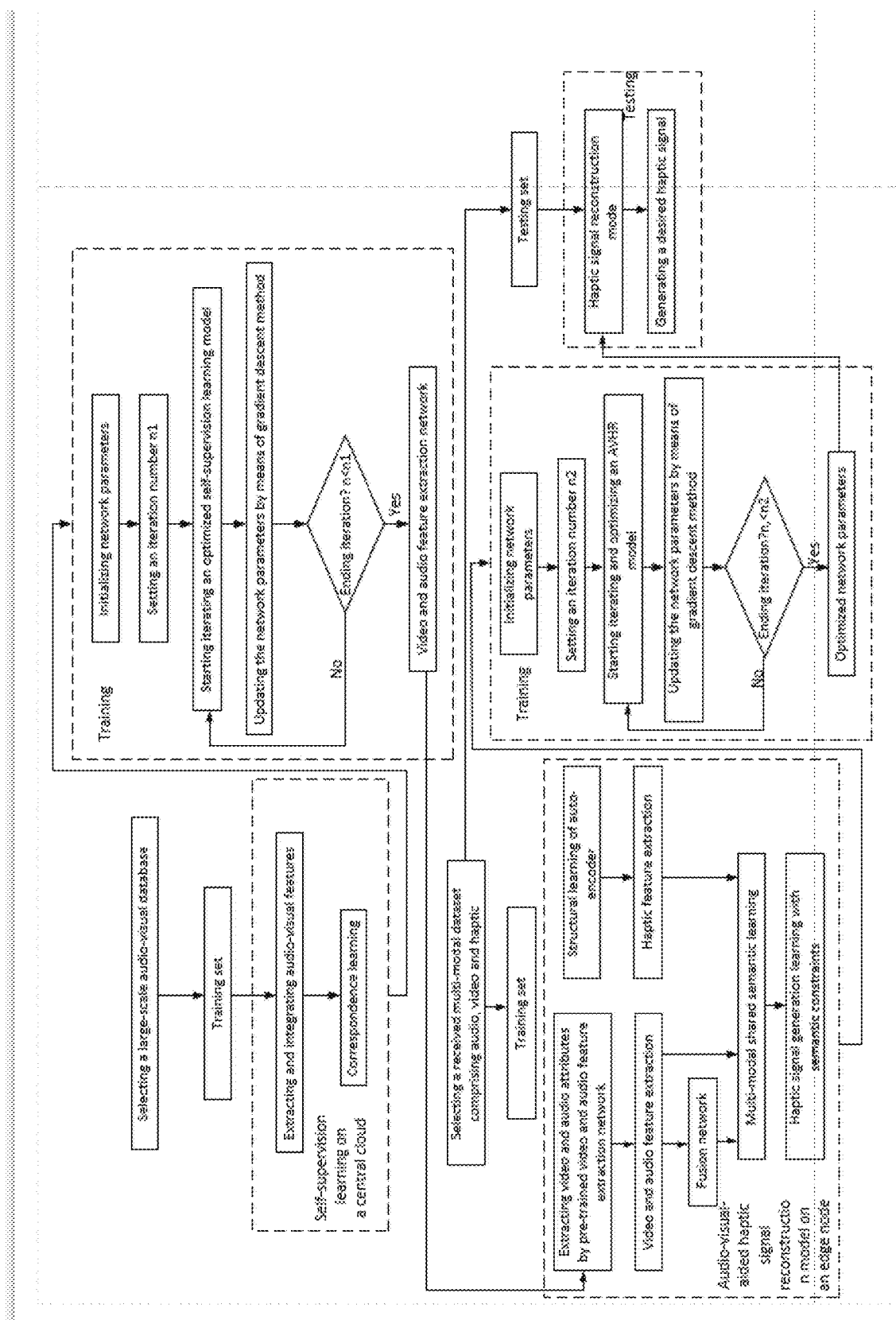
FIG. 1 illustrates a flow chart of an audio-visual-aided haptic signal reconstruction method based on a cloud-edge collaboration according to the present disclosure.

Provided is an audio-visual-aided haptic signal reconstruction method based on a cloud-edge collaboration, the flow chart of which is as illustrated in FIG. 1, the method includes the following steps.

Figure 2:
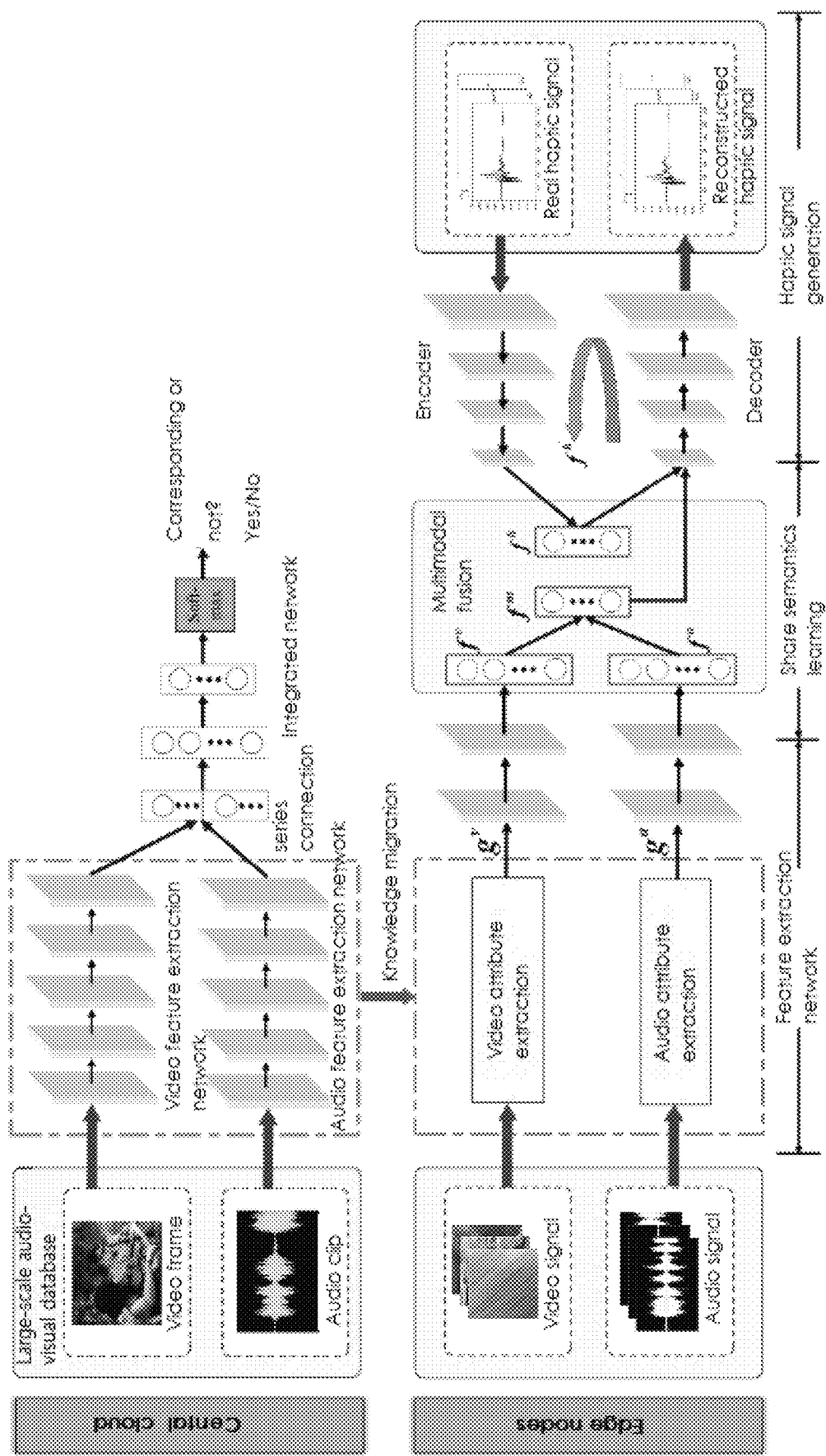
FIG. 2 illustrates a diagram of a complete network structure according to the present disclosure.

In Step 1, a self-supervision learning task as illustrated in FIG. 2 is executed on a large-scale audio-visual database stored on a central cloud to determine whether video frames and audio clips are from the same audio-visual source, thereby obtaining a pre-trained audio feature extraction network and a pre-trained video feature extraction network.

(1-1) For the large-scale audio-visual database $S=\{s_j\}_{j=1}^{M}$, where $s_j=(v_j^s, a_j^s)$, a 224×224 color video frame $v_j^s$ and an audio clip $a_j^s$ with a duration of one second are transferred to the video feature extraction network and the audio feature extraction network respectively, and the corresponding video signal features and audio signal features are extracted respectively. Here, a design style of a VGG network is adopted in the video feature extraction network, that is, a 3×3 convolution filter and a 2×2 unfilled maximum pooling layer with a stride of 2 are provided. The network is divided into four blocks, each of the blocks contains two convolution layers and one pooling layer, and the number of filters between successive blocks is doubled. Eventually, the maximum pooling is performed in all spatial positions to generate a single semantic feature vector with 512 dimensions. A sound clip with a duration of one second is converted into a linear spectrum graph first and treated as a 257×199 grayscale image by the audio feature extraction network. The other structures of the audio feature extraction network is similar to the video feature extraction network, the difference is that the input pixel is one-dimension intensity, and a semantic feature vector with 512 dimensions is eventually obtained as well.

Then, the above two of the video feature and the audio feature with 512 dimensions are spliced into a vector with 1024 dimensions, and the bidirectional classification output is generated through the integrated network composed of two full-connection layers (128-2). That is, whether the video frames and audio clips are from the same audio-visual source is determined. A self-supervision loss function is defined as follows:

$$L_{Src} = -\frac{1}{M}\Sigma_{j=1}^{M} p(g_j^s; \theta_g^s)\log \hat{p}(g_j^s; \theta_g^s) + [1 - p(g_j^s; \theta_g^s)]\log[1 - \hat{p}(g_j^s; \theta_g^s)],$$

where $L_{Src}$ is the self-supervision loss function, $g_j^s=[G_v(v_j^s; \theta_v^s), G_a(a_j^s; \theta_a^s)]$ is a feature after integrating of the j-th pair of video frame features and audio clip features, $G_v(\cdot)$ is a feature mapping of the video feature extraction network, $\theta_v^s$ is a parameter for the video feature extraction network, $G_a(\cdot)$ is a feature mapping of the audio feature extraction network, and $\theta_a^s$ is a parameter for the audio feature extraction network. $p(\cdot)$ represents a tag indicator, when the tag indicator is 1, it represents that the video frames and audio clips are from the same audio-visual source, and when the tag indicator is 0, it represents that the video frame and audio clip are from different audio-visual sources. $\hat{p}(\cdot)$ represents a correspondence predicted value output from the integrated network and $\theta_g^s$ represents a parameter for the integrated network composed of the plurality of full-connection layers. The pre-trained audio feature extraction network and the pre-trained video feature extraction network are obtained by minimizing $L_{Src}$.

The structure and parameters for the video feature extraction network and the audio feature extraction network can be obtained in this step, that is $G_v(\cdot)$, $G_a(\cdot)$, $\theta_v^s$, and $\theta_a^s$, which can be taken as knowledge to be transferred to the feature extraction network at the edge node, and provide a good starting point for processing the audio signals and the video signals.

In Step 2, an audio-visual-aided haptic signal reconstruction (AVHR) model is designed at an edge node, a structure of the model is as illustrated in FIG. 2.

After audio signals and video signals are received by the edge node, first the pre-trained audio feature extraction network and the pre-trained video feature extraction network on the central cloud are taken as an audio attribute extraction network and a video attribute extraction network of the edge nodes. After audio signal attributes and video signal attributes are extracted, audio signal features and video signal features associated between the audio signals and the video signals are further extracted from the audio signal attributes and the video signal attributes.

Then, the audio signal features and the video signal features are fused by using a fusion network combining with a multi-modal collaboration and a multi-modal joint paradigm and fused features are obtained.

Simultaneously, haptic signal features are extracted by a haptic feature extraction network.

An audio feature extraction network, a video feature extraction network, the haptic feature extraction network and the fusion network are trained according to the audio signal features, the video signal features, the haptic signal features and the fused features, by using a semantic correlation learning and semantic discrimination learning strategies. Shared semantics of the audio signals, the video signals, the haptic signals and the fused features are learned to obtain fused features containing the shared semantics.

Eventually, the fused features containing the shared semantics are input into a haptic signal generation network with semantic constraints to implement a reconstruction of a target haptic signal.

Step (2) specifically lies as follows.

(2-1) The audio feature extraction network structure and the video feature extraction network structure and their parameters that are completely trained on the central cloud are migrated to the edge node directly. The audio feature extraction network and the video feature extraction network are taken as the audio attribute extraction network and the video attribute extraction network at the edge node, respectively.

(2-2) Complete audio signals, video signals and haptic signals received by the edge nodes are taken as a multi-modal training data set D, $D=\{d_i\}_{i=1}^N$, the i-th instance $d_i=(v_i, a_i, h_i)$, and $(v_i, a_i, h_i)$ is the i-th pair of multi-modal samples, where $v_i \in R^w$ is the i-th video signal in the multi-modal training data set, $R^w$ is a sample space of the video signals, and w is a sample dimensionality of the video signals; $a_i \in R^u$ is the i-th audio signal in the multi-modal training data set, $R^u$ is a sample space of the audio signals, and u is a sample dimensionality of the audio signals; $h_i \in R^e$ is the i-th haptic signal in the multi-modal training data set, $R^e$ is a sample space of the haptic signals, and e is a sample dimensionality of the haptic signals. Each of $d_i$ has a corresponding one-hot tag $y_i \in R^K$, $R^K$ is the tag space, where K is the number of categories in the multi-modal training data set.

(2-3) A video attribute $g^v=G_v(v; \theta_v^s)$ with 512 dimensions and an audio attribute $g^a=G_a(a; \theta_a^s)$ with 512 dimensions are extracted at the edge nodes by using the video feature extraction network and the audio feature extraction network migrated from the central cloud, where v is a video signal, and a is an audio signal; and then, $g^v$ and $g^a$ are further input into a three-layer full-connection neural network (256-128-32) to obtain a video signal feature $f^v=F_v(v; \theta_v)$ with 32 dimensions and an audio signal feature $f^a=F_a(a; \theta_a)$, $f^v$ and $f^a$ are associated with each other, where $F_v(\cdot)$ is the video feature extraction network at the edge node, $\theta_v$ represents a parameter for the video feature extraction network, $F_a(\cdot)$ is the audio feature extraction network at the edge node, and $\theta_a$ represents a parameter for the video feature extraction network.

(2-4) An encoder of an auto-encoder model is taken as the haptic feature extraction network at the edge node, and a target haptic signal feature $f^h=E_h(h; \theta_{he})$ for training is extracted by using the haptic feature extraction network, where h represents a haptic signal, $E_h(\cdot)$ represents the encoder at the edge node, and $\theta_{he}$ represents a parameter for the encoder. A stacked auto-encoder is adopted by the haptic auto-encoder, and the structure of the encoder and the decoder is symmetrical to each other. A three-layer feedforward neural network is adopted by the encoder to project the haptic signal into a haptic signal feature (Z-256-128-32) with 32 dimensions, where Z is a dimension of an input haptic signal. The structure of the decoder is just opposite to the encoder.

Figure 3:
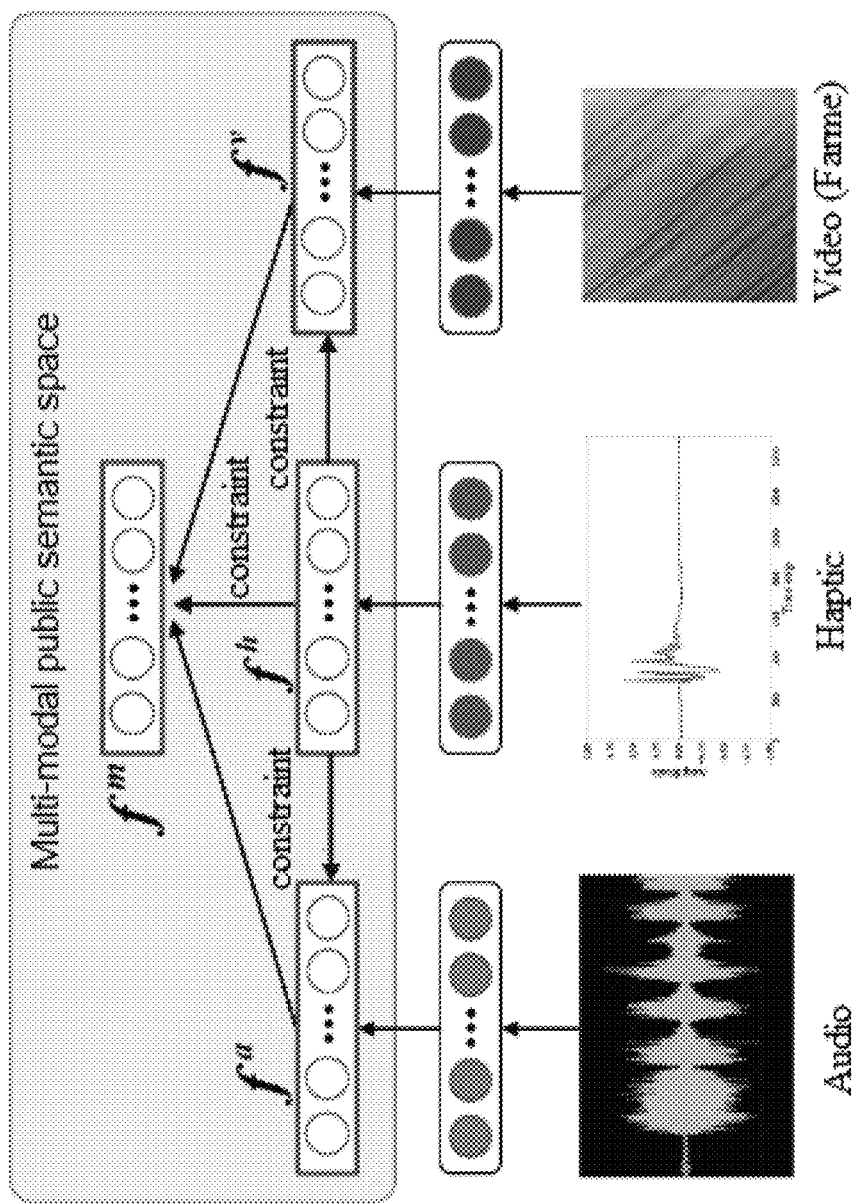
FIG. 3 illustrates a schematic diagram of a shared semantic learning architecture based on a multi-modal fusion according to the present disclosure.

(2-5) The video signal feature $f^v$ and the audio signal feature $f^a$ are fused to implement the semantic complementation and enhancement. As illustrated in FIG. 3, the fusion network combines a multi-modal collaboration paradigm and the multi-modal joint paradigm.

A, the multi-modal collaboration is that semantic similarities between $f^a$, $f^v$ and $f^h$ under a constraint of a haptic modal are maximized.

B, a multi-modal joint is that $f^a$ and $f^v$ are deeply integrated on a basis of the multi-modal collaboration paradigm, the specific processes are as follows:

$$f^m=F_m(f^a, f^v; \theta_m),$$

where $f^m$ is a fused feature of the video signal feature and the audio signal feature that are associated with each other; $F_m(\cdot)$ is a mapping function of a multi-modal joint network, $F_m(\cdot)$ is a linear weighting of the $f^a$ and the $f^v$; and $\theta_m$ is the parameter for the multi-modal joint network.

(2-6) A learning of the shared semantics is executed on the video signal feature $f^v$, the audio signal feature $f^a$, the haptic signal feature $f^h$ and the fused feature $f^m$ that are associated with each other. The learning of the shared semantics includes the semantic correlation learning and the semantic discrimination learning.

The semantic correlation learning: a correlation constraint is performed on $f^v$, $f^a$, $f^m$ and $f^h$ by selecting a contrast loss, and distances between $f^h$ and $f^v$, $f^a$ and $f^m$ that are matched with $f^h$ are reduced. Distances between $f^h$ and $f^v$, $f^a$ as well as $f^m$ that are not matched with the $f^h$ to be greater than a threshold $\delta$. A semantic related loss function is defined as follows:

$$L_{corr}^{av} = \Sigma_{p \neq q}^{N,N} \max(0, l_2(f_p^v, f_p^h) + l_2(f_p^a, f_p^h) + \delta - l_2(f_p^v, f_q^h) - l_2(f_p^a, f_q^h)), \text{ and}$$

$$L_{corr}^m = \Sigma_{p \neq q}^{N,N} \max(0, l_2(f_p^m, f_p^h) + \delta - l_2(f_p^m, f_q^h)),$$

where the audio signal feature $f^a$ and the haptic signal feature $f^h$ form an audio and haptic pair, the video signal feature $f^v$ and the haptic signal feature $f^h$ form an video and haptic pair, and $L_{corr}^{av}$ is a contrast loss function of audio haptic pair and the video haptic pair, $L_{corr}^m$ is a contrast loss function of the fused feature $f^m$ and the haptic signal feature $f^h$. $f_p^v$ is the p-th video signal feature, $f_p^a$ is the p-th audio signal feature, $f_p^m$ is the p-th fused feature, $f_p^h$ is the p-th haptic signal feature, and $f_q^h$ is the q-th haptic signal feature. $l_2(\cdot) = \|\cdot\|_2$ represents l2 norm.

The semantic discrimination learning: a full-connection layer with a softmax function is selected as a public classifier, and the public classifier is added to the video feature extraction network, the audio feature extraction network, the haptic feature extraction network and the fusion network. A consistency and a differentiation of cross-modal semantics are ensured under a guidance of a supervision information. A semantic discrimination loss function is defined as follows:

$$L_{Dis} = -\frac{1}{N}\Sigma_i^N y_i[\log p(f_i^v; \theta_l) + \log p(f_i^a; \theta_l) + \log p(f_i^h; \theta_l) + \log p(f_i^m; \theta_l)],$$

where $L_{Dis}$ is the semantic discrimination loss function, $p(\cdot)$ is the public classifier, $f_i^v$ is the i-th video signal feature, $f_i^a$ is the i-th audio signal feature, $f_i^h$ is the i-th haptic signal feature, $f_i^m$ is the i-th fused feature, and $\theta_l$ is a parameter for the public classifier.

(2-7) The auto-encoder model includes the encoder and the decoder. A structure of the auto-encoder model is learned by comparing the haptic signal h for training with a haptic signal h obtained during a process from the encoder to the decoder (Z-256-128-32-128-256-Z, Z is a dimension of the haptic signal), thereby effectively maintaining the semantic consistency within the haptic modal, enabling the haptic feature $f^h$ output by the encoder to be more reasonable, and improving the learning of the multi-modal public semantic space.

A reconstruction loss of the haptic signal is defined as follows:

$$L_{Rec} = \frac{1}{N}\Sigma_{i=1}^N \|\tilde{h}_i - h_i\|_2^2 + \alpha\|\theta_h\|_2^2,$$

where $L_{Rec}$ is a reconstruction loss function, $\tilde{h}_i$ is the i-th haptic signal reconstructed by the auto-encoder model, $\tilde{h}_i = D_h(E_h(h_i; \theta_{he}); \theta_{hd})$, and $h_i$ is the i-th real haptic signal. $E_h(\cdot)$ is the encoder, the encoder serves as the haptic feature extract network and is configured to extract haptic features. $D_h(\cdot)$ is the decoder, the decoder serves as the haptic signal generation network and is configured to generate the haptic features, and $\theta_h = [\theta_{he}, \theta_{hd}]$ represents a set of parameters for the encoder. Specifically, $\theta_{he}$ is a parameter for the encoder, $\theta_{hd}$ is a parameter for the decoder, and $\alpha$ is a hyperparameter.

(2-8) The target haptic signal h' is generated by using the decoder $D_h(\cdot)$ of the self-encoder model from the fused feature $f^m$ to implement the reconstruction of the target haptic signal, and the h' is remapped to the haptic signal feature $f^{h'}$ with 32 dimensions by the encoder $E_h(\cdot)$, thereby ensuring the feature semantic similarity and the category discrimination between $f^{h'}$ and $f^h$ and constraining the generation process precisely. A loss function of the haptic signal generated is defined as follows:

$$L_{Gen} = \frac{1}{N}\sum_{i=1}^N \{\|h_i - h_i'\|_2^2 + \beta[l_2(f_i^h, f_i^{h'}) + y_i \log p(f_i^{h'})]\} + \gamma\|\theta_{hd}\|_2^2,$$

where $L_{Gen}$ is a generating loss function of the haptic signal, $h_i' = D_h(f_i^m; \theta_{hd})$ is the i-th haptic signal generated by the fused feature, $f_i^m$ is the i-th fused feature, $f_i^h$ is the i-th haptic feature, $f_i^{h'} = E_h(h_i'; \theta_{hd})$ is a semantic feature of $h_i'$ extracted by the encoder, $l_2(f_i^h, f_i^{h'})$ represents a similarity between $f_i^h$ and $f_i^{h'}$, $y_i \log p(f_i^{h'})$ is a classification loss of $f_i^{h'}$, and $p(f_i^{h'})$ is a predicted tag of $f_i^{h'}$. $l_2(f_i^h, f_i^{h'})$ and $y_i \log p(f_i^{h'})$ together form a regular term of a loss function. $\beta$ and $\gamma$ are hyperparameters.

In Step 3, the model is trained at the central cloud and the edge node respectively by a gradient descent algorithm to obtain structures and parameters for an optimal AVHR model.

(3-1) The video feature extraction network and the audio feature extraction network are trained on a large-scale audio-visual database $S = \{s_j\}_{j=1}^M$ stored on a central cloud, the specific processes are as follows.

In Step 311, $\theta_v^s(0)$, $\theta_a^s(0)$ and $\theta_g^s(0)$ are initialized, and the $\theta_v^s(0)$, the $\theta_a^s(0)$ and the $\theta_g^s(0)$ are values for $\theta_v^s$, $\theta_a^s$ and $\theta_g^s$ in the 0-th iteration, respectively.

In Step 312, a total number of iterations is set to be $n_1 = 600$, the number of the iterations is given to be n=0; and a learning rate is set to be $\mu_1 = 0.0001$.

In Step 313, each network parameter is optimized by adopting a stochastic gradient descent method SGD:

$$\theta_v^s(n+1) = \theta_v^s(n) - \mu_1 \nabla_{\theta_v^s} L_{Src},$$

$$\theta_a^s(n+1) = \theta_a^s(n) - \mu_1 \nabla_{\theta_a^s} L_{Src}, \text{ and}$$

$$\theta_g^s(n+1) = \theta_g^s(n) - \mu_1 \nabla_{\theta_g^s} L_{Src},$$

where $\theta_v^s(n+1)$, $\theta_a^s(n+1)$ and $\theta_g^s(n+1)$ as well as $\theta_v^s(n)$, $\theta_a^s(n)$ and $\theta_g^s(n)$ are parameters for the video feature extraction network, the audio feature extraction network and an integrated network at the central cloud in the n+1-th and the n-th iteration, respectively; and $\nabla$ is a partial derivative for each of loss functions.

In Step 314, when $n<n_1$, it is skipped to Step 313, n=n+1, and a next iteration is continued; if not, the iterations are terminated.

In Step 315, after $n_1$ rounds of the iterations, an optimized video feature extraction network $G_v(\theta_v^s)$ and an optimized audio feature extraction network $G_a(\theta_a^s)$ optimal are obtained.

(3-2) The AVHR model is trained on a multi-modal training data set received by the edge node, the specific processes are as follows.

In Step 321, $\theta_v(0)$, $\theta_a(0)$, $\theta_m(0)$, $\theta_{he}(0)$ and $\theta_l(0)$ are initialized, and the $\theta_v(0)$, the $\theta_a(0)$, the $\theta_m(0)$, the $\theta_{he}(0)$ and the $\theta_l(0)$ are values for $\theta_v$, $\theta_a$, $\theta_m$, $\theta_{he}$, and $\theta_l$ in the 0-th iteration, respectively.

In Step 322, the iterations is started, a total number of the iterations is set to be $n_2$=600, and the number of the iterations is set to be n'=0; and a learning rate is set to be $\mu_2$=0.0001.

In Step 323, parameters for each feature extraction network, the fusion network, and a public classifier are optimized by adopting the stochastic gradient descent method, functions are as follows:

$$\theta_v(n'+1)=\theta_v(n')-\mu_2\nabla_{\theta_v}(L_{corr}^{av}+L_{corr}^{m}+L_{Dis}),$$

$$\theta_a(n'+1)=\theta_a(n')-\mu_2\nabla_{\theta_a}(L_{corr}^{av}+L_{corr}^{m}+L_{Dis}),$$

$$\theta_{he}(n'+1)=\theta_{he}(n')-\mu_2\nabla_{\theta_{he}}(L_{corr}^{av}+L_{corr}^{m}+L_{Dis}+L_{Rec}),$$

$$\theta_l(n'+1)=\theta_l(n')-\mu_2\nabla_{\theta_l}L_{Dis}, \text{ and}$$

$$\theta_m(n'+1)=\theta_m(n')-\mu_2\nabla_{\theta_m}(L_{corr}^{m}+L_{Dis}),$$

where $\theta_v(n'+1)$, $\theta_a(n'+1)$, $\theta_{he}(n'+1)$, $\theta_l(n'+1)$, $\theta_m(n'+1)$ and $\theta_v(n')$, $\theta_a(n')$, $\theta_{he}(n')$, $\theta_l(n')$, and $\theta_m(n')$ are respectively parameters for the video feature extraction network, the audio feature network, the encoder, and the public classifier at the edge node in the n+1-th iteration and the n-th iteration; and the $\nabla$ is the partial derivative for each loss function.

In Step 324, a parameter for the decoder is optimized by adopting the stochastic gradient descent method SGD:

$$\theta_{hd}(n'+1)=\theta_{hd}(n')-\mu_2\nabla_{\theta_{hd}}(L_{Gen}+L_{Rec}),$$

where $\theta_{hd}(n'+1)$ and $\theta_{hd}(n')$ are respectively parameters for the decoder at the edge node in the n+1-th iteration and in the n-th iteration; and the $\nabla$ is the partial derivative for each loss function.

In Step 325, when $n'<n_2$, it is skipped to Step 323, n'=n'+1, and the next iteration is continued; if not, the iterations are terminated.

In Step 326, after $n_2$ rounds of the iterations, the optimal AVHR model is obtained. The optimal AVHR model includes the optimized video feature extraction network, the optimized audio feature extraction network, an optimized haptic feature extraction network, an optimized fusion network and an optimized haptic signal generation network.

In Step 4, after the above steps are completed, the paired audio signals and video signals in the test set are input into the AVHR model completely trained, the semantic features of the audio signals and video signals are extracted and fused, and the target haptic signal is generated by the fused semantic features.

(4-1) The AVHR model completely trained is adopted.

(4-2) A pair of an audio signal $\hat{v}$ and a video signal $\hat{a}$ to be tested are input into the AVHR model being completely trained, the respective semantic features are extracted and fused. A desired haptic signal $\hat{h}'$ is generated by the fused semantic features.

The following experimental results show that compared with the existing methods, the complementary fusion of multi-modal semantics is used by the present disclosure to implement a haptic signal synthesis and achieve a better generation effect.

This embodiment adopts a LMT cross-modal data set for experiment, which is proposed by the document "Multi-modal feature based surface material classification", including samples of nine semantic categories: grid, stone, metal, wood, rubber, fiber, foam, foil and paper, textiles and fabrics. Five categories (each of which includes three sub-categories) are selected for the experiment in this embodiment. The LMT data set is reorganized. 20 image samples, 20 audio signal samples and 20 haptic signal samples of each of the instances are respectively obtained by combining the training set and the test set of each of the material instances first.

Then the data are expended to train the neural network, specifically, each of the images is reversed horizontally and vertically, and is rotated by any angle, and the techniques such as the random scaling, the clipping, and the deviation are adopted in addition to the traditional methods. So far, the data in each category are expanded to 100, so there are 1500 images in total, with the size of 224*224. In the data set, 80% are selected for training, and the remaining 20% is used for testing and performance evaluation. Three methods in the following are tested as the experimental comparisons.

The first existing method: the ensembled GANs (E-GANs) in the document "Learning cross-modal visual-tactile representation using ensembled generative adversarial networks" (by authors X. Li, H. Liu, J. Zhou, and F. Sun) adopt the image features to obtain the required category information, and then required category information is taken with the noise as the input of the generation antagonism network to generate the haptic spectrum of the corresponding categories.

The second existing method: the deep visio-tactile learning (DVTL) method in the document "Deep Visuo-Tactile Learning: Estimation of Tactile Properties from Images" (by authors Kuniyuki Takahashi and Jethro Tan) extends the traditional encoder-decoder network with potential variables and embeds the visual and haptic properties into the potential space.

The third existing method: a joint-encoding-classification GAN (JEC-GAN) provided in the document "Teaching Cameras to Feel: Estimating Tactile Physical Properties of Surfaces From Images" (by authors Matthew Purri and Kristin Dana) encodes the instance of each of the modes to a shared internal space through different encoding networks, and adopts the paired constraint to enable visual samples and haptic samples that are embedded to be proximate to each other in the potential space. Eventually, the corresponding haptic signals are reconstructed through the generation network with visual information as the input.

The present disclosure: the method in the present embodiment.

The classification accuracy is adopted as an evaluation index to evaluate the effect of the cross-modal generation in the experiment, the used classifier is pre-trained on the real haptic signal data set.

The experiment results of the present disclosure are as shown in Table 1.

|  | Gird | Stone | Metal | Wood | Rubber | Average |
|---|---|---|---|---|---|---|
| The first existing method | 0.683 | 0.400 | 0.183 | 0.250 | 0.800 | 0.463 |
| The second existing | 0.683 | 0.483 | 0.433 | 0.133 | 0.817 | 0.510 |
| The third existing method | 0.317 | 0.567 | 0.800 | 0.550 | 0.900 | 0.627 |
| The present disclosure | 0.717 | 0.583 | 0.667 | 0.733 | 0.967 | 0.733 |

Figure 4:
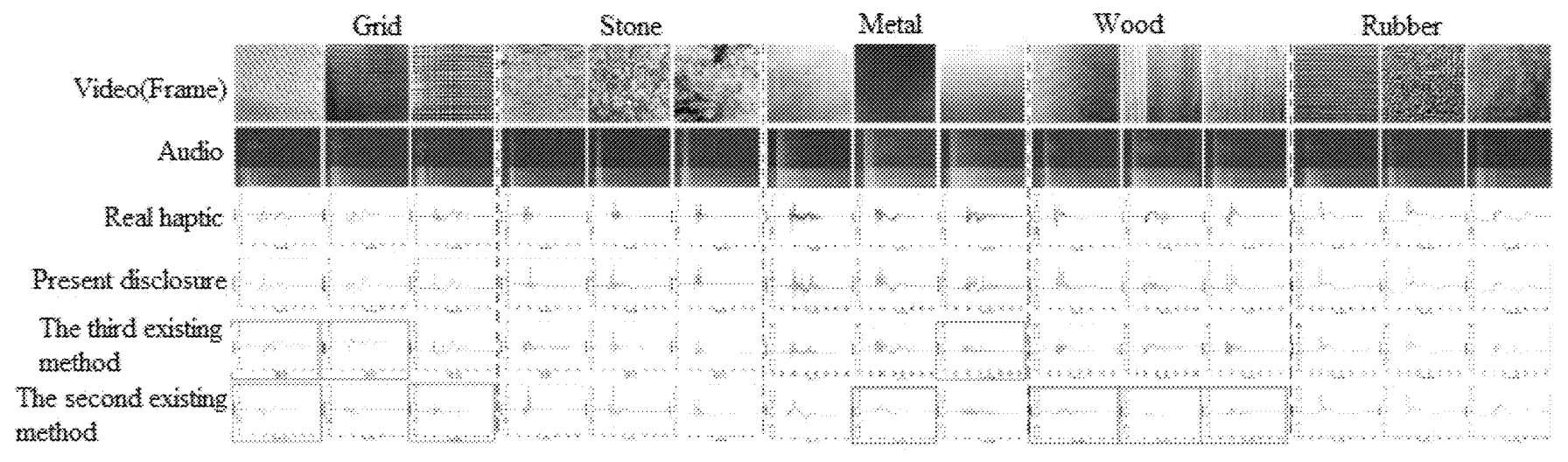

It can be seem from Table 1 and FIG. 4 that the method disclosed in the present disclosure has obvious advantages in comparison with the above-mentioned most advanced methods, and the reasons are as follows. (1) The self-supervision pre-training effectively improves the extraction effect of the video features and the audio features. (2) The fusion of the video modal and the audio modal realizes the complementation and enhancement of the semantic information. (3) The circulating optimization strategy improves the learning effect of the fused features containing the shared semantics.

In other embodiments, the feedforward neural network is used by the haptic encoder in Step (2) of the present disclosure, which can be replaced by one-dimensional convolutional neural networks (1D-CNN).

The above are only the specific implementations of the present disclosure, but the protection scope of the present disclosure are not limited thereto. The changes and replacements that would be easily conceived by any technicians familiar with the technical field within the technical scope disclosed in the present disclosure should be covered within the protection scope of the present disclosure.

What is claimed is:

1. An audio-visual-aided haptic signal reconstruction method based on a cloud-edge collaboration, wherein the method comprises following steps:

Step (1), executing, on a large-scale audio-visual database stored on a central cloud, a self-supervision learning task, wherein the self-supervision learning task refers to determining whether video frames and audio clips are from a same audio-visual source, thereby obtaining a pre-trained audio feature extraction network and a pre-trained video feature extraction network;

Step (2), designing, at an edge node, an audio-visual-aided haptic signal reconstruction AVHR model, the reconstruction AVHR model being specifically as follows:

first taking, after receiving audio signals and video signals by the edge node, the pre-trained audio feature extraction network and the pre-trained video feature extraction network on the central cloud as an audio attribute extraction network and a video attribute extraction network of the edge node, further extracting, after extracting audio signal attributes and video signal attributes, audio signal features and video signal features associated between the audio signals and the video signals from the audio signal attributes and the video signal attributes;

then, fusing, by using a fusion network combining a multi-modal collaboration and a multi-modal joint paradigm, the audio signal features and the video signal features, and obtaining fused features;

simultaneously, extracting, by a haptic feature extraction network, haptic signal features;

training, according to the audio signal features, the video signal features, the haptic signal features and the fused features, an audio feature extraction network, a video feature extraction network, the haptic feature extraction network and the fusion network, by using a semantic correlation learning and semantic discrimination learning strategies, and learning shared semantics of the audio signals, the video signals, the haptic signals and the fused features, to obtain the fused features containing the shared semantics; and inputting the fused features containing the shared semantics into a haptic signal generation network with semantic constraints, to implement a reconstruction of a target haptic signal;

Step (3), training, by a gradient descent algorithm, the AVHR model at the central cloud and the edge node respectively, to obtain structures and parameters for an optimal AVHR model; and Step (4), inputting paired audio signals and video signals to be tested into the optimal AVHR model, wherein the optimal AVHR model is configured to extract and fuse semantic features of the audio signals and the video signals, and generate the target haptic signal by fused semantic features.

2. The audio-visual-aided haptic signal reconstruction method based on the cloud-edge edge collaboration according to claim 1, wherein Step (1) includes following steps:

(1-1), for the large-scale audio-visual database $S=\{s_j\}_{j=1}^{M}$, where M is a number of the video frames and the audio clips that are in pairs, $s_j=(v_j^s, a_j^s)$, $s_j$ is a j-th pair of the video frames and the audio clips, transferring the j-th video frame $v_j^s$ and the j-th audio clip $a_j^s$ to the video feature extraction network and the audio feature extraction network respectively, and extracting corresponding video features and audio features respectively; and (1-2), connecting the video features and the audio features, and inputting the video features and the audio features into an integrated network composed of a plurality of full-connection layers and outputting integrated features, and then performing, by using the integrated features, the self-supervision learning task, wherein an objective of the self-supervision learning is to determine whether the video frames and audio clips are from the same audio-visual source; and specifically, defining a self-supervision loss function as follows:

$$L_{Src} = -\frac{1}{M}\Sigma_{j=1}^{M} p(g_j^s; \theta_g^s)\log \hat{p}(g_j^s; \theta_g^s) + [1 - p(g_j^s; \theta_g^s)]\log[1 - \hat{p}(g_j^s; \theta_g^s)],$$

where $L_{Src}$ is the self-supervision loss function, $g_j^s=[G_v(v_j^s; \theta_v^s), G_a(a_j^s; \theta_a^s)]$ is a feature after integrating a j-th pair of video frame features and audio clip features, $G_v(\cdot)$ is a feature mapping of the video feature extraction network, $\theta_v^s$ is a parameter for the video feature extraction network, $G_a(\cdot)$ is a feature mapping of the audio feature extraction network, $\theta_a^s$ is a parameter for the audio feature extraction network; $p(\cdot)$ represents a tag indicator, when the tag indicator is 1, it represents that the video frames and audio clips are from the same audio-visual source, when the tag indicator is 0, it represents that the video frame and audio clip are from different audio-visual sources; $\hat{p}(\cdot)$ represents a correspondence predicted value output from the integrated network; $\theta_g^s$ represents a parameter for the integrated network composed of the plurality of full-connection layers; and the pre-trained audio feature extraction network and the pre-trained video feature extraction network are obtained by minimizing $L_{Src}$.

3. The audio-visual-aided haptic signal reconstruction method based on the cloud-edge collaboration according to claim 1, wherein Step (2) includes following steps:

(2-1), directly migrating an audio feature extraction network, a video feature extraction network, parameters for the audio feature extraction network and parameters for the video feature extraction network that are completely trained in the central cloud to the edge node, and taking the audio feature extraction network and the video feature extraction network as the audio attribute extraction network and the video attribute extraction network at the edge node respectively;

(2-2), taking complete audio signals, video signals and haptic signals received by the edge node as a multi-modal training data set D, $D=\{d_i\}_{i=1}^{N}$, an i-th instance $d_i=(v_i, a_i, h_i)$, and $(v_i, a_i, h_i)$ being an i-th pair of multi-modal samples, where $v_i \in R^w$ is an i-th video signal in the multi-modal training data set, $R^w$ is a sample space of the video signals, and w is a sample dimensionality of the video signals; $a_i \in R^u$ is an i-th audio signal in the multi-modal training data set, $R^u$ is a sample space of the audio signals, and u is a sample dimensionality of the audio signals; $h_i \in R^e$ is an i-th haptic signal in the multi-modal training data set, $R^e$ is a sample space of the haptic signals, and e is a sample dimensionality of the haptic signals; and each $d_i$ has a corresponding one-hot tag $y_i \in R^K$, $R^K$ is the tag space, K is a number of categories in the multi-modal training data set;

(2-3), extracting, by means of edge node, a video attribute $g^v=G_v(v; \theta_v^s)$ and an audio attribute $g^a=G_a(a; \theta_a^s)$ respectively, by using the video feature extraction network and the audio feature extraction network migrated from the central cloud, where v is a video signal, and a is an audio signal; and then, further inputting $g^v$ and $g^a$ into a multi-layer feature network to obtain a video signal feature $f^v=F_v(v; \theta_v)$ and an audio signal feature $f^a=F_a(a; \theta_a)$, $f^v$ and $f^a$ being associated with each other, where $F_v(\cdot)$ is the video feature extraction network at the edge node, $\theta_v$ represents the parameter for the video feature extraction network, $F_a(\cdot)$ is the audio feature extraction network at the edge node, and $\theta_a$ represents the parameter for the video feature feature extraction network;

(2-4), taking, by the edge node, an encoder of an auto-encoder model as the haptic feature extraction network, and extracting, a target haptic signal feature $f^h=E_h(h; \theta_{he})$ for training by using the haptic feature extraction network, where h represents a haptic signal, $E_h(\cdot)$ represents the encoder at the edge node, and $\theta_{he}$ represents a parameter for the encoder;

(2-5), fusing, by using the fusion network combining a multi-modal collaboration paradigm and the multi-modal joint paradigm, $f^v$ and $f^a$, and obtaining the fused features, A, the multi-modal collaboration: maximizing semantic similarities between $f^a$, $f^v$ and $f^h$ under a constraint of a haptic modal; and B, a multi-modal joint: deeply integrating the $f^a$ and the $f^v$ on a basis of the multi-modal collaboration paradigm, specific processes being as follows:

$$f^m = F_m(f^a, f^v; \theta_m),$$

where $f^m$ is a fused feature of the video signal feature and the audio signal feature that are associated with each other; $G_m(\cdot)$ is a mapping function of a multi-modal joint network, $F_m(\cdot)$ is a linear weighting of the $f^a$ and the $f^v$; and $\theta_m$ is the parameter for the multi-modal joint network;

(2-6), performing a learning of the shared semantics on the video signal feature $f^v$, the audio signal feature $f^a$, the haptic signal feature f and the fused feature $f^m$ that are associated with each other, wherein the learning of the shared semantics includes the semantic correlation learning and the semantic discrimination learning:

the semantic correlation learning: performing, by selecting a contrast loss, a correlation constraint on $f^v$, $f^a$, $f^m$ and $f^h$, reducing distances between $f^h$ and $f^v$, $f^a$ as well as $f^m$ that are matched with $f^h$, and enabling distances between $f^h$ and $f^v$, $f^a$ as well as $f^m$ that are not matched with $f^h$ to be greater than a threshold $\delta$, and defining a semantic related loss function as follows:

$$L_{corr}^{av} = \Sigma_{p \neq q}^{N,N} \max(0, l_2(f_p^v, f_p^h) + l_2(f_p^a, f_p^h) + \delta - l_2(f_p^v, f_q^h) - l_2(f_p^a, f_q^h)), \text{ and}$$

$$L_{corr}^{m} = \Sigma_{p \neq q}^{N,N} \max(0, l_2(f_p^m, f_p^h) + \delta - l_2(f_p^m, f_q^h)),$$

where the audio signal feature $f^a$ and the haptic signal feature $f^h$ forms an audio haptic pair, the video signal feature $f^v$ and the haptic signal feature $f^h$ forms an video haptic pair, and $L_{corr}^{av}$ is a contrast loss function of the audio haptic pair and the video haptic pair; $L_{corr}^{m}$ is a contrast loss function of the fused feature $f^m$ and the haptic signal feature $f^h$, $f_p^v$ a p-th video signal feature, $f_p^a$ is a p-th audio signal feature, $f_p^m$ is a p-th fused feature, $f_p^h$ is a p-th haptic signal feature, and $f_q^h$ is a q-th haptic signal feature; and $l_2(\cdot) = \|\cdot\|_2$ represents l2 norm; and the semantic discrimination learning: selecting a full-connection layer with a softmax function as a public classifier, and adding the public classifier to the video feature extraction network, the audio feature extraction network, the haptic feature extraction network and the fusion network, ensuring a consistency and a differentiation of cross-modal semantics under a guidance of supervision information, and defining a semantic discrimination loss function as follows:

$$L_{Dis} = -\frac{1}{N}\Sigma_i^N y_i \left[\log p(f_i^v; \theta_l) + \log p(f_i^a; \theta_l) + \log p(f_i^h; \theta_l) + \log p(f_i^m; \theta_l)\right],$$

where $L_{Dis}$ is the semantic discrimination loss function, $p(\cdot)$ is the public classifier, $f_i^v$ is an i-th video signal feature, $f_i^a$ is an i-th audio signal feature, $f_i^h$ is an i-th haptic signal feature, $f_i^m$ is an i-th fused feature, and $\theta_l$ is a parameter for the public classifier;

(2-7), the auto-encoder model including the encoder and a decoder, learning, by comparing the haptic signal h for training with a haptic signal $\tilde{h}$ obtained during a process from the encoder to the decoder, a structure of the auto-encoder model, and defining a reconstruction loss of the haptic signal as follows:

$$L_{Rec} = \frac{1}{N}\Sigma_{i=1}^{N} \|\tilde{h}_i - h_i\|_2^2 + \alpha \|\theta_h\|_2^2,$$

where $L_{Rec}$ is a reconstruction loss function, $\tilde{h}_i$ is an i-th haptic signal reconstructed by the auto-encoder model, $\tilde{h}_i = D_h(E_h(h_i; \theta_{he}); \theta_{hd})$, $h_i$ is an i-th real haptic signal; $E_h(\cdot)$ is the encoder serving as the haptic feature extract network and configured to extract haptic features; $D_h(\cdot)$ is the decoder serving as the haptic signal generation network and configured to generate the haptic features, and $\theta_h=[\theta_{he}, \theta_{hd}]$ represents a set of parameters for the encoder, specifically, $\theta_{he}$ is a parameter for the encoder, $\theta_{hd}$ is a parameter for the decoder, and $\alpha$ is a hyperparameter; and (2-8), generating, by using the decoder $D_h(\cdot)$ of the auto-encoder model, the target haptic signal h' from the $f^m$ to implement the reconstruction of the target haptic signal, and remapping, by the encoder $E_h(\cdot)$, the h' to a haptic signal feature $f^{h'}$, and defining a loss function of the haptic signal generated as follows:

$$L_{Gen} = \frac{1}{N}\sum_{i=1}^{N}\{\|h_i - h'_i\|_2^2 + \beta[l_2(f_i^h, f_i^{h'}) + y_i \log p(f_i^{h'})]\} + \gamma\|\theta_{hd}\|_2^2,$$

where $L_{Gen}$ is a generating loss function of the haptic signal, $h_i'=D_h(f_i^m; \theta_{hd})$ is an i-th haptic signal generated by the fused feature, $f_i^m$ is an i-th fused feature, $f_i^h$ is an i-th haptic feature, $f_i^{h'}=E_h(h_i'; \theta_{hd})$ is a semantic feature of $h_i'$ extracted by the encoder, $l_2(f_i^h, f_i^{h'})$ represents a similarity between $f_i^h$ and $f_i^{h'}$, $y_i \log p(f_i^{h'})$ is a classification loss of $f_i^{h'}$, $p(f_i^{h'})$ is a predicted tag of $f_i^{h'}$, $l_2(f_i^h, f_i^{h'})$ and $y_i \log p(f_i^{h'})$ together form a regular term of a loss function; and $\beta$ and $\gamma$ are hyperparameters.

4. The audio-visual-aided haptic signal reconstruction method based on the cloud-edge collaboration according to claim 1, wherein Step (3) includes following steps:

(3-1), training, on a large-scale audio-visual database $S=\{s_j\}_{j=1}^M$ stored on a central cloud, the video feature extraction network and the audio feature extraction network, specific processes being as follows:

Step 311, initializing $\theta_v^s(0)$, $\theta_a^s(0)$ and $\theta_g^s(0)$ that are values for $\theta_v^s$, $\theta_a^s$ and $\theta_g^s$ in a 0-th iteration, respectively;

Step 312, setting a total number of iterations to be $n_1$, giving a number of the iterations to be n=0; and setting a learning rate $\mu_1$;

Step 313, optimizing each network parameter by adopting a stochastic gradient descent method SGD:

$\theta_v^s(n+1)=\theta_v^s(n)-\mu_1\nabla_{\theta_v^s}L_{Src},$ $\theta_a^s(n+1)=\theta_a^s(n)-\mu_1\nabla_{\theta_a^s}L_{Src},$ and $\theta_g^s(n+1)=\theta_g^s(n)-\mu_1\nabla_{\theta_g^s}L_{Src},$ where $\theta_v^s(n+1)$, $\theta_a^s(n+1)$ and $\theta_g^s(n+1)$ as well as $\theta_v^s(n)$, $\theta_a^s(n)$ and $\theta_g^s(n)$ are parameters for the video feature extraction network, the audio feature extraction network and an integrated network at the n+1-th iteration and the n-th iteration in the central cloud, respectively; and $\nabla$ is a partial derivative for each loss function;

Step 314, skipping, when $n<n_1$, to Step 313, n=n+1, and continuing a next iteration; if not, terminating the iterations; and Step 315, obtaining, after $n_1$ rounds of the iterations, an optimized video feature extraction network $G_v(\theta_v^s)$ and an optimized audio feature extraction network $G_a(\theta_a^s)$;

(3-2), training the AVHR model on a multi-modal training data set received by the edge node, specific processes being as follows:

Step 321, initializing $\theta_v(0)$, $\theta_a(0)$, $\theta_m(0)$, $\theta_{he}(0)$ and $\theta_l(0)$ that are values for $\theta_v$, $\theta_a$, $\theta_m$, $\theta_{he}$, and $\theta_l$ in a 0-th iteration, respectively;

Step 322, starting the iterations, setting a total number of the iterations to be $n_2$, and giving a number of the iterations to be n'=0; and setting a learning rate $\mu_2$; and Step 323, optimizing, by adopting the stochastic gradient descent method, parameters for each feature extraction network, the fusion network, and a public classifier:

$\theta_v(n'+1)=\theta_v(n')-\mu_2\nabla_{\theta_v}(L_{corr}^{av}+L_{corr}^m+L_{Dis}),$ $\theta_a(n'+1)=\theta_a(n')-\mu_2\nabla_{\theta_a}(L_{corr}^{av}+L_{corr}^m+L_{Dis}),$ $\theta_{he}(n'+1)=\theta_{he}(n')-\mu_2\nabla_{\theta_{he}}(L_{corr}^{av}+L_{corr}^m+L_{Dis}+L_{Rec}),$ $\theta_l(n'+1)=\theta_l(n')-\mu_2\nabla_{\theta_l}L_{Dis},$ and $\theta_m(n'+1)=\theta_m(n')-\mu_2\nabla_{\theta_m}(L_{corr}^m+L_{Dis}),$ where $\theta_v(n'+1)$, $\theta_a(n'+1)$, $\theta_{he}(n'+1)$, $\theta_l(n'+1)$, $\theta_m(n'+1)$ and $\theta_v(n')$, $\theta_a(n')$, $\theta_{he}(n')$, $\theta_l(n')$, and $\theta_m(n')$ are respectively parameters for the video feature extraction network, the audio feature network, the encoder, and the public classifier at the n+1-th iteration and at the n-th iteration in the edge node; and the $\nabla$ is the partial derivative for each loss function;

Step 324, optimizing, by adopting the stochastic gradient descent SGD, a parameter for the decoder:

$\theta_{hd}(n'+1)=\theta_{hd}(n')-\mu_2\nabla_{\theta_{hd}}(L_{Gen}+L_{Rec}),$ where $\theta_{hd}(n'+1)$ and $\theta_{hd}(n')$ are respectively parameters for the decoder at the n+1-th iteration and at the n-th iteration in the edge node; and the $\nabla$ is the partial derivative for each loss function;

Step 325, skipping, when $n'<n_2$, to Step 323, n'=n'+1, and continuing the next iteration; if not, terminating the iterations; and Step 326, obtaining, after $n_2$ rounds of the iterations, the optimal AVHR model including the optimized video feature extraction network, the optimized audio feature extraction network, an optimized haptic feature extraction network, an optimized fusion network and an optimized haptic signal generation network.

5. The audio-visual-aided haptic signal reconstruction method based on the cloud-edge collaboration according to claim 1, wherein Step (4) includes following steps:

(4-1), adopting the AVHR model completely trained; and
(4-2), inputting a pair of an audio signal and a video signal to be tested into the AVHR model completely trained, extracting and fusing the respective semantic features, and generating, by the fused semantic features, a desired haptic signal.

* * * * *